US008730773B2

(12) United States Patent
Wang et al.

(10) Patent No.: US 8,730,773 B2
(45) Date of Patent: May 20, 2014

(54) OPTICAL DATA ACCESS APPARATUS AND METHOD THEREOF

(75) Inventors: Chih Yuan Wang, Hsinchu (TW); Shih-Jung Chiu, Tainan County (TW); Fu Jung Chen, Tainan (TW)

(73) Assignee: Mediatek Inc., Hsinchu (TW)

( * ) Notice: Subject to any disclaimer, the term of this patent is extended or adjusted under 35 U.S.C. 154(b) by 1540 days.

(21) Appl. No.: 11/772,479

(22) Filed: Jul. 2, 2007

(65) Prior Publication Data

US 2009/0010114 A1 Jan. 8, 2009

(51) Int. Cl.
*G11B 7/00* (2006.01)

(52) U.S. Cl.
USPC .................................................... 369/44.25

(58) Field of Classification Search
None
See application file for complete search history.

(56) References Cited

U.S. PATENT DOCUMENTS

| | | | | |
|---|---|---|---|---|
| 5,675,561 | A * | 10/1997 | Yoshioka | 369/44.25 |
| 6,940,788 | B2 * | 9/2005 | Hirashima | 369/44.29 |
| 7,333,412 | B2 | 2/2008 | Manoh et al. | |
| 7,512,042 | B2 * | 3/2009 | Ogura et al. | 369/44.27 |
| 2001/0055256 | A1 * | 12/2001 | Ueki | 369/53.23 |
| 2006/0077796 | A1 * | 4/2006 | Yajima et al. | 369/44.25 |

OTHER PUBLICATIONS

Office Action from corresponding Taiwanese Application No. 096146498 dated Mar. 11, 2011.

* cited by examiner

*Primary Examiner* — Joseph Haley
*Assistant Examiner* — Emily Frank
(74) *Attorney, Agent, or Firm* — Grossman, Tucker, Perreault & Pfleger, PLLC

(57) ABSTRACT

A method for controlling an OPU and an optical data access apparatus are provided. A signal generator is configured to generate a servo signal in response to data access. A comparator is configured to compare a threshold level and the servo signal, and generate a control level if a level of the servo signal against the threshold level when the OPU is controlled. An adjustment unit is configured to adjust a control signal according to the control level. The OPU is controlled according to the adjusted control signal.

10 Claims, 8 Drawing Sheets

OPTICAL DATA ACCESS APPARATUS AND METHOD THEREOF

CROSS-REFERENCES TO RELATED APPLICATIONS

Not applicable

BACKGROUND OF THE INVENTION

1. Field of the Invention

The present invention relates to an optical data access apparatus and method for controlling an optical pick-up.

2. Descriptions of the Related Art

In these days, more and more people like to use optical data access apparatus, such as an optical disc drive, to access data on a optical disc, for it has advantages of large storage capacity and small size. A conventional optical disc drive comprises a spindle, a signal processing unit (SPU), a digital control unit (DCU), an optical pick-up (OPU), and a central processing unit (CPU).

When the optical disc drive is activated to access the data on an optical disc, the spindle rotates the optical disc and the OPU emits light, receives the reflected light from the optical disc and transmits signals to the SPU. The SPU then converts the signals into a plurality of servo signals, such as a focus error (FE) signal, a tracking error signal, a RF signal and/or a defect signal. These servo signals are analyzed by the CPU. If the light does not focus on the desired position, the CPU controls the DCU to generate a control signal to make the OPU adjust the light focus continuously until the light focuses on the desired position. This is so-called a focus-search period. Once the CPU determines that the light will focus on the right position for a period of time (a focus-on detection period), the optical disc drive enters a focus-on period and the data on the optical disc can be accessed correctly.

FIG. 1 shows a time diagram to specify the aforementioned periods, wherein the servo signal is the RF signal 202. During the focus-search period 11, the OPU is controlled to approach the optical disc, and the RF signal 202 becomes larger and larger while the focus of the light gets closer to the desired position. Once the RF signal 202 is larger than a threshold level 204, the optical disc drive judges that the focus of the light is close to the desired position. Then the optical disc drive determines whether the light keeps focusing on the desired position for the period of time. This is the focus-on detection period 12. If yes, the optical disc drive enters the focus-on period 13 and the OPU may access data from the optical disc correctly.

During the focus-on detection period 12, the OPU keeps moving toward the optical disc because of inertia, and the probability of hitting the optical disc is high. This causes the damages of the OPU as well as the optical disc.

During the focus-on period 13, it is possible that the OPU is forced to move toward the optical disc directly to do keep focusing if the light suddenly fails to focus on the desired position. Referring to FIG. 2, then the RF signal 202 goes below a threshold level 206, the CPU judges that the focus of the light is far from the desired position. And the CPU determines whether the light focus drop from the desired position for a period of time, that is the so-called focus-drop detection period 22. If the RF signal 202 goes below the threshold for the focus-drop detection period 22, the optical disc drive enters a focus-drop period 23. Similarly, if the OPU hits the optical disc due to its inertia, this also causes the damages of the OPU and the optical disc.

Therefore, a solution for preventing the OPU of an optical data access apparatus from hitting a disc is needed in this field.

SUMMARY OF THE INVENTION

One objective of this invention is to provide a method for controlling an optical pick-up (OPU). The method comprises steps of: monitoring a servo signal; generating a control level if a level of the servo signal against a threshold level when the OPU is controlled; adjusting a control signal according to the control level; and controlling the OPU according to the adjusted control signal.

Another objective of this invention is to provide an optical data access apparatus. The optical data access apparatus comprises an OPU, a signal generator, a comparator, and an adjustment unit. The OPU is configured to access data from an optical disc. The signal generator is configured to generate a servo signal in response to the access. The comparator is configured to compare the servo signal with a threshold level, and generate a control level if a level of the servo signal is against the threshold level when the OPU is controlled. The adjustment unit is configured to adjust a control signal according to the control level. The OPU is controlled according to the adjusted control signal.

The present invention provides a certain level to pull an OPU of an optical data access apparatus away from an optical disc so that the OPU would not hit the optical disc.

BRIEF DESCRIPTION OF THE DRAWINGS

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
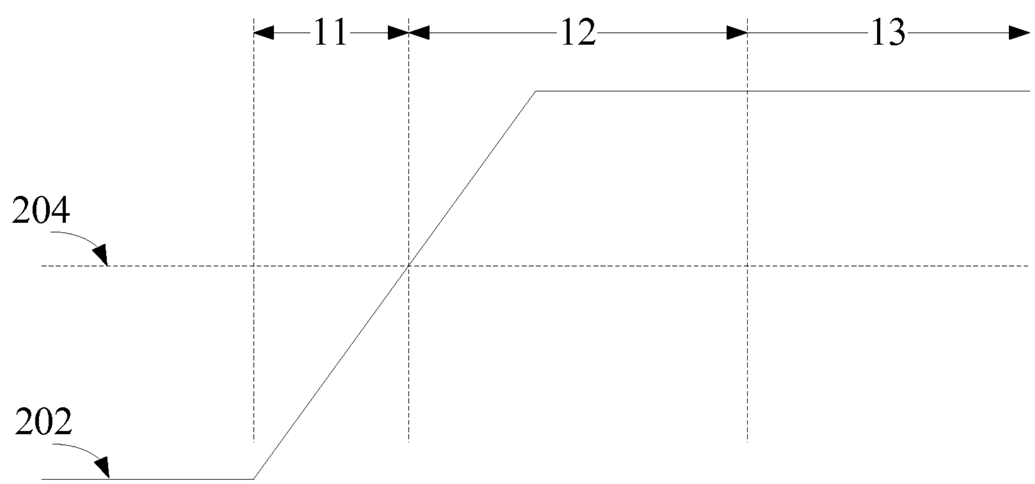
FIG. 1 is a time diagram of a RF signal of the optical disc drive of the prior art.
Figure 2:
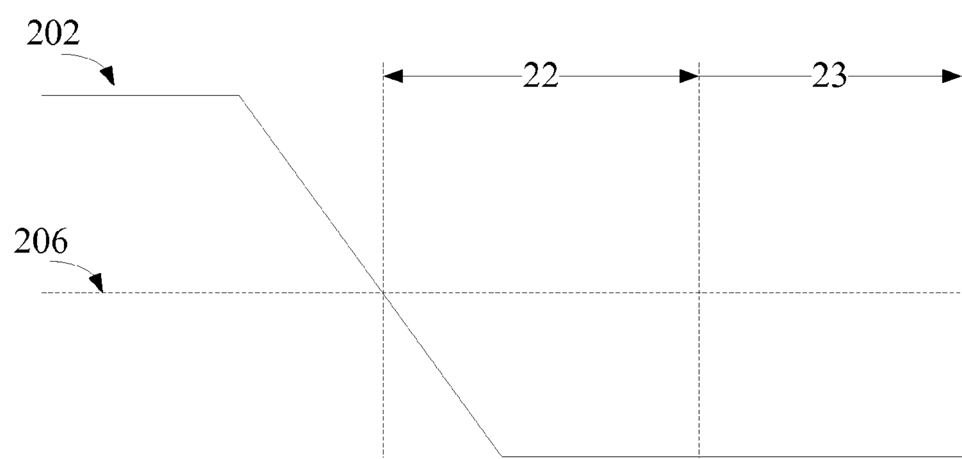
FIG. 2 is a time diagram of the RF signal of the optical disc drive of the prior art.
Figure 3:
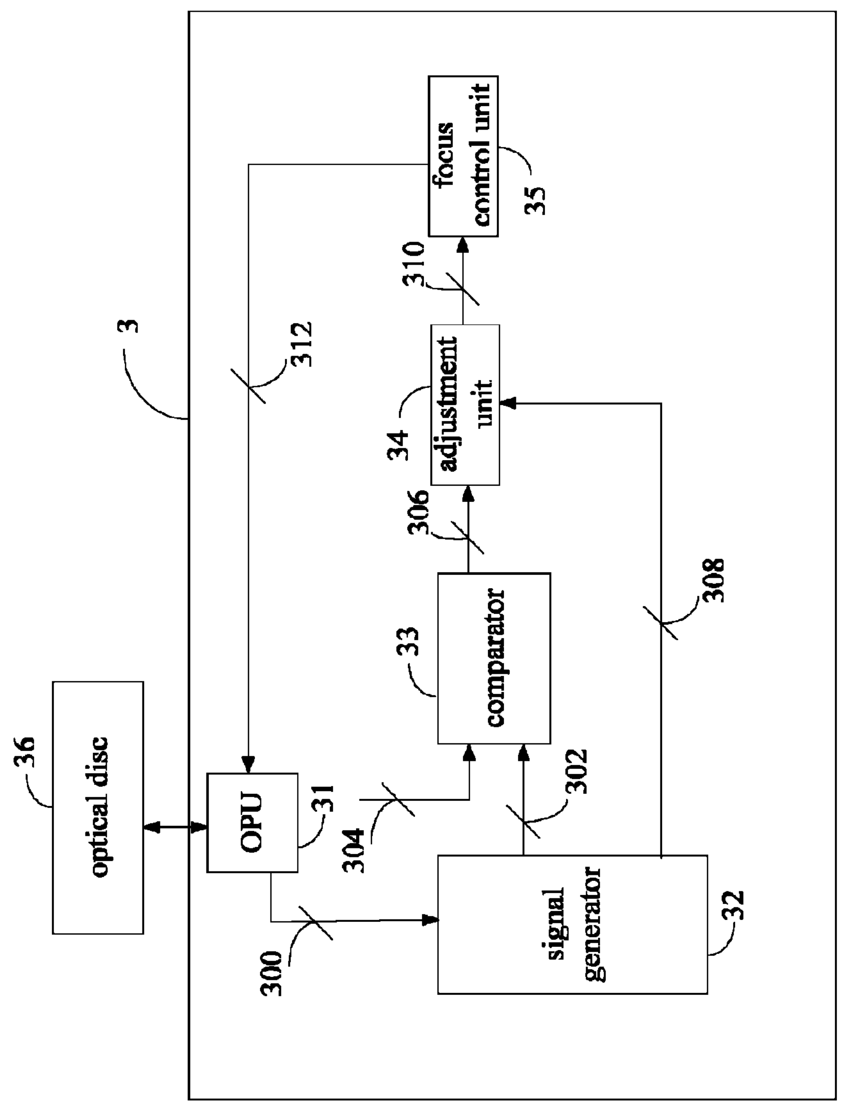
FIG. 3 is a block diagram of a first embodiment of the present invention.

FIG. 3 shows a first embodiment of the present invention, which is an optical data access apparatus 3 for accessing data on an optical disc 36. The optical data access apparatus 3 comprises an OPU 31, a signal generator 32, a comparator 33, an adjustment unit 34, and a focus control unit 35. In this embodiment, the optical disc 36 may be a CD, VCD, DVD, HD-DVD, Blu-ray disc, or the like.

When accessing the data on the optical disc 36, the OPU 31 is controlled to approach the optical disc 36 from its initial position until the light emitted from the OPU 31 focuses on the desired position. This period is the focus-search period.

After the light focuses on the desired position, the optical data access apparatus 3 determines whether the light keeps focusing on the desired position for a period of time. If yes, the optical data access apparatus 3 enters the focus-on period and the OPU 31 may access the data correctly.

During a period between the focus-search period and the focus-on period, the signal generator 32 generates a servo signal 302 in response to a signal 300 generated by the access of the OPU 31, wherein the servo signal 302 can be, for example, a RF signal, an FE signal, a defect detecting signal, a main beam derived signal, or a side beam derived signal. The RF signal carries the data accessed from the optical disc 36, and the defect detecting signal indicates a defect status of the optical disc 36. For the sake of illustration, the RF signal is chosen to represent the servo signal 302. It is noted that the RF signal 302 comprises a main beam sum and/or a side beam sum. Either one can be used in the first embodiment.

The comparator 33 receives the RF signal 302 and compares it with a threshold level 304. If the RF signal 302 reaches the threshold level 304, i.e. the optical data access apparatus 3 enters the period between the focus-search period and the focus-on period, the comparator 33 generates a control level 306. A value of the control level 306 is determined according to a format of the optical disc 36. In other words, the value for CD, VCD, DVD, HD-DVD, Blu-ray disc is different due to various optical specifications thereof.

The signal generator 32 generates an FE signal 308, derived from the signal 300, to determine whether the OPU 31 is able to access data correctly. The adjustment unit 34 receives the control level 306 and the FE signal 308, and adjusts the FE signal 308 according to the control level 306. In particular, the adjustment unit 34 subtracts the control level 306 from the FE signal 308 to form an adjusted FE signal 310. The adjusted FE signal 310 is then transmitted to the focus control unit 35. And the focus control unit 35 generates a focus control output (FOO) 312 to the OPU 31 according to the adjusted FE signal 310. Finally the OPU 31 acts in response to the FOO 312.

Figure 4:
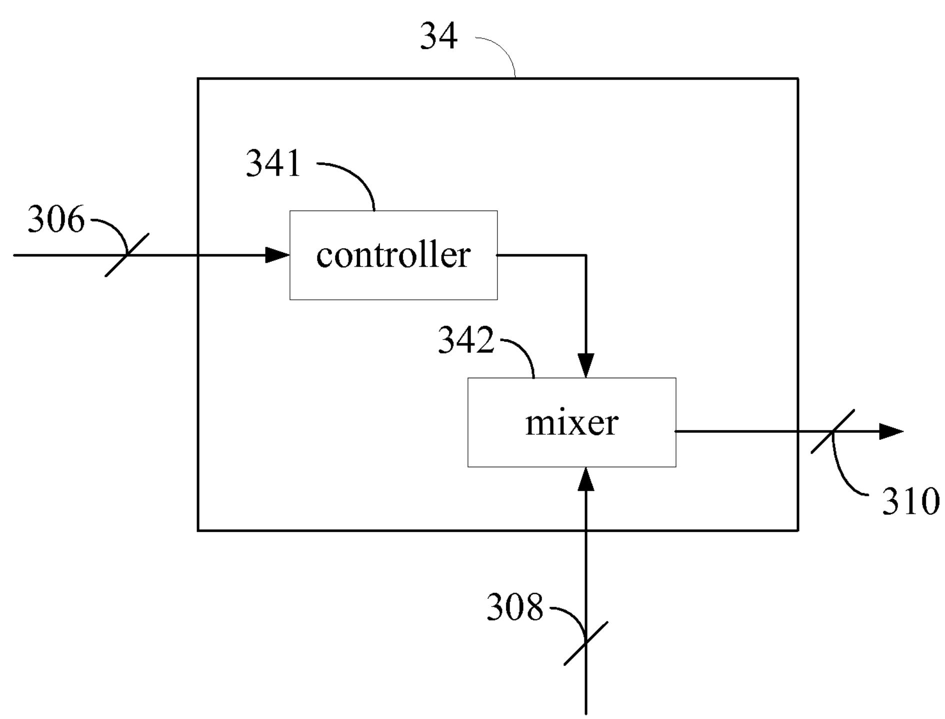
FIG. 4 is a block diagram of an adjustment unit of the first embodiment.

Referring to FIG. 4, in another modification of the present embodiment, the adjustment unit 34 processes the control level 306 first by a controller 341, then mixes the processed control level 306 with the FE signal 308 by a mixer 342 to form the adjusted FE signal 310.

Comparing with the conventional technology, before the optical data access apparatus 3 enters the focus-on period, the FOO 312 is formed according to the adjusted FE signal 310 which is generated by the adjustment unit 34 subtracting the control level 306 from the FE signal 308, and a movement of the OPU 31 is controlled by the FOO 312, then the FOO 312 can prevent the OPU 31 from hitting the optical disc 36 due to inertia. In another words, when the RF signal 302 crosses the threshold level 304, an offset force in response to the FOO 312 would be applied on the OPU 31 to pull down the OPU 31. When the optical data access apparatus 3 enters the focus-on period, the control level 306 will be removed so the adjustment unit 34 transmits the FE signal 308 to the focus control unit 35 thus the FOO 312 returns to the normal level. That is, the OPU 31 is able to access the data on the optical disc 36 correctly and stably.

When the light is suddenly out of focus for some reason during the focus-on period, for example, mechanical shake, the optical data access apparatus 3 enters a focus-drop period, which means that the RF signal 302 turns below the threshold level 304 suddenly. If this situation occurs, it means that the light is out of focus. Then the comparator 33 generates the control level 306 if the RF signal 302 goes below the threshold level 304. The adjustment unit 34 adjusts the FE signal 308 corresponding to the control level 306. In particular, the formation of the FOO 312 is similar with the above description and not described herein. Because the OPU 31 would move to try to keep focusing during the focus-drop period and the movement might make the OPU 31 hit the optical disc 36, the FOO 312 can also pull the OPU 31 away from the optical disc 36. Therefore, the hitting will not occur. On the other hand, by implementing the present invention, the focus control unit set a force to pull down the OPU, this small force can be set immediately when the RF signal reach a threshold or applied slowly after the RF signal level reach the threshold.

Figure 5:
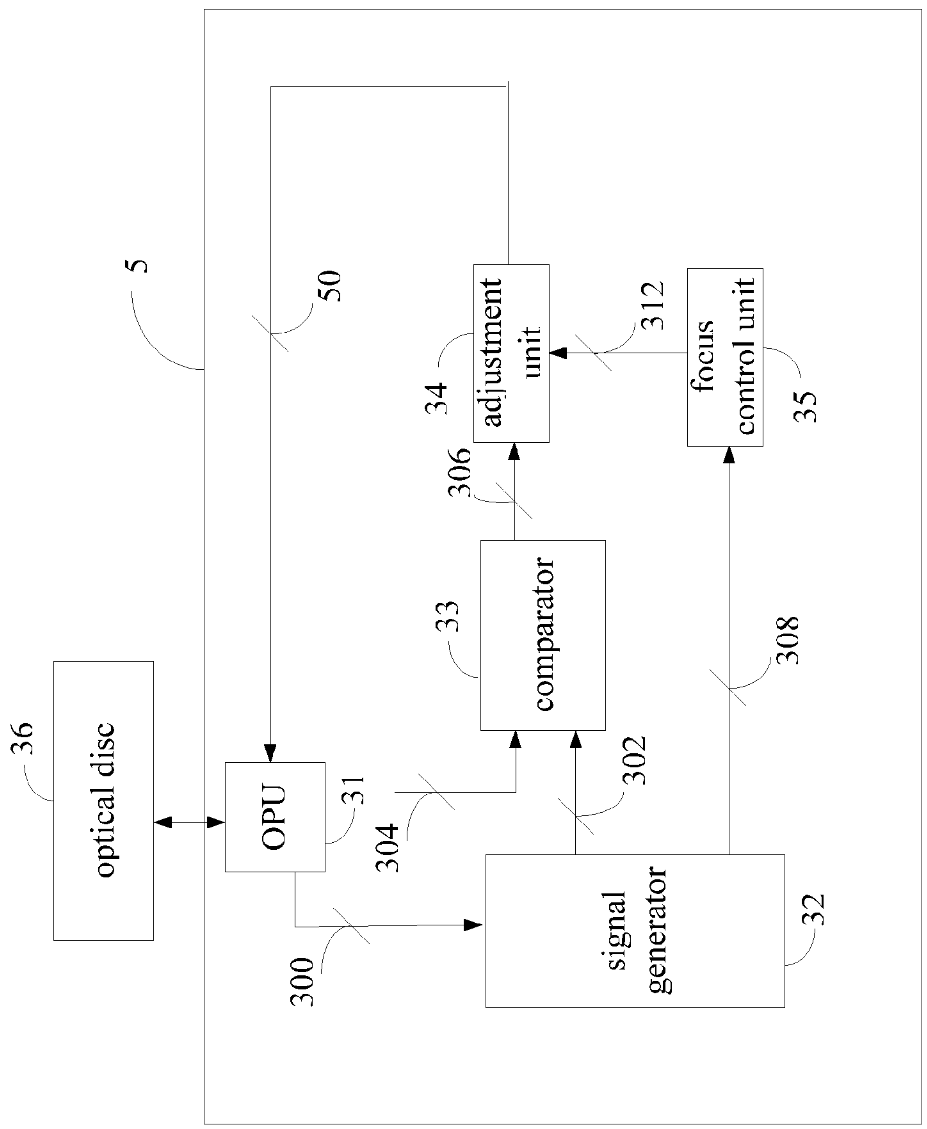
FIG. 5 is a block diagram of a second embodiment of the present invention.

FIG. 5 shows a second embodiment of the present invention, which is an optical data access apparatus 5. In contrast with the first embodiment, the FE signal 308 is inputted to the focus control unit 35 directly, rather than inputted to the adjustment unit 34. Then the focus control unit 35 generates the FOO 312 after receives the FE signal 308 and transmits the FOO 312 to the adjustment unit 34. The adjustment unit 34 shifts a level of the FOO 312 by subtracting the control level 306 from the FOO 312. The shifted FOO 50 is generated in the focus-on period and/or the focus-drop period to prevent the OPU 31 from hitting the optical disc 36.

Figure 6:
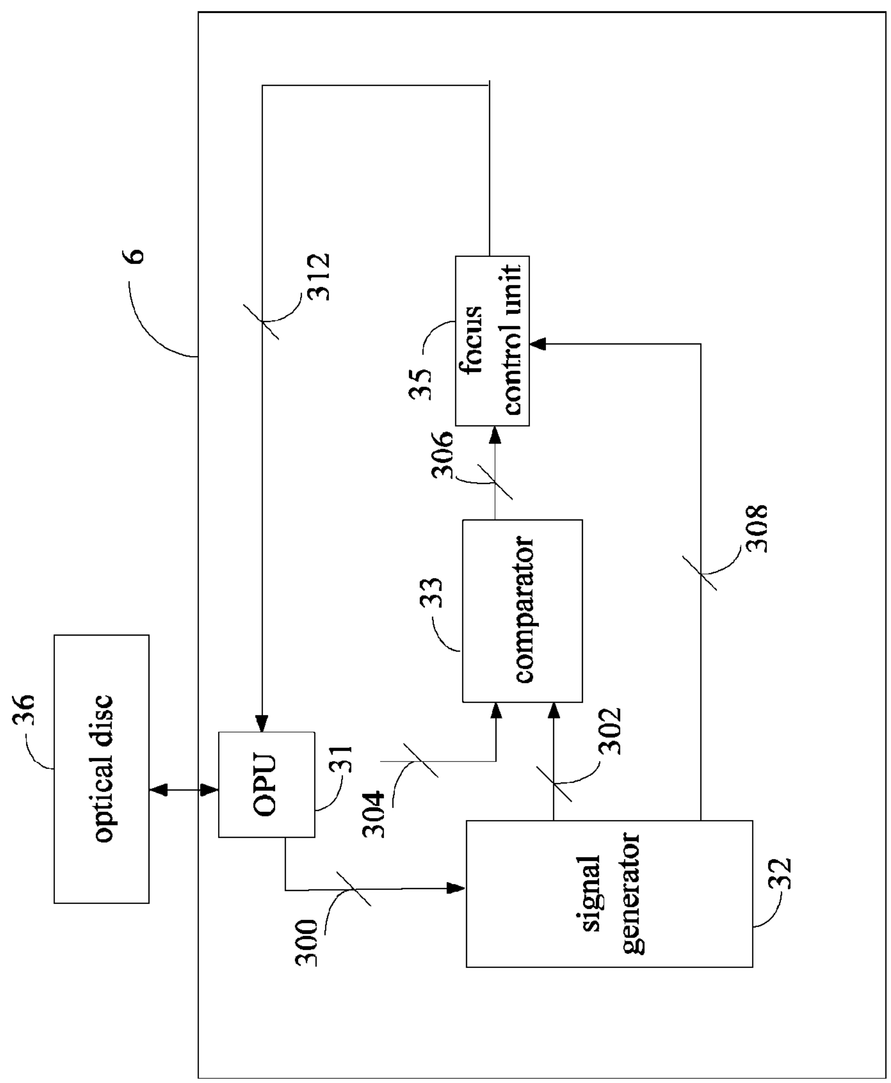
FIG. 6 is a block diagram of a third embodiment of the present invention.

FIG. 6 shows a third embodiment of the present invention, which is an optical data access apparatus 6. Comparing with the first embodiment, the adjustment unit 34 (shown in FIG. 3) is embedded in the focus control unit 35. Similar with the second embodiment, the FE signal 308 is inputted to the focus control unit 35 directly. The focus control unit 35 generates the FOO 312 according to the control level 306. The FOO 312 which responds to the control level 306 is generated in the focus-on period and/or the focus-drop period to prevent the OPU 31 from hitting the optical disc 36.

Figure 7:
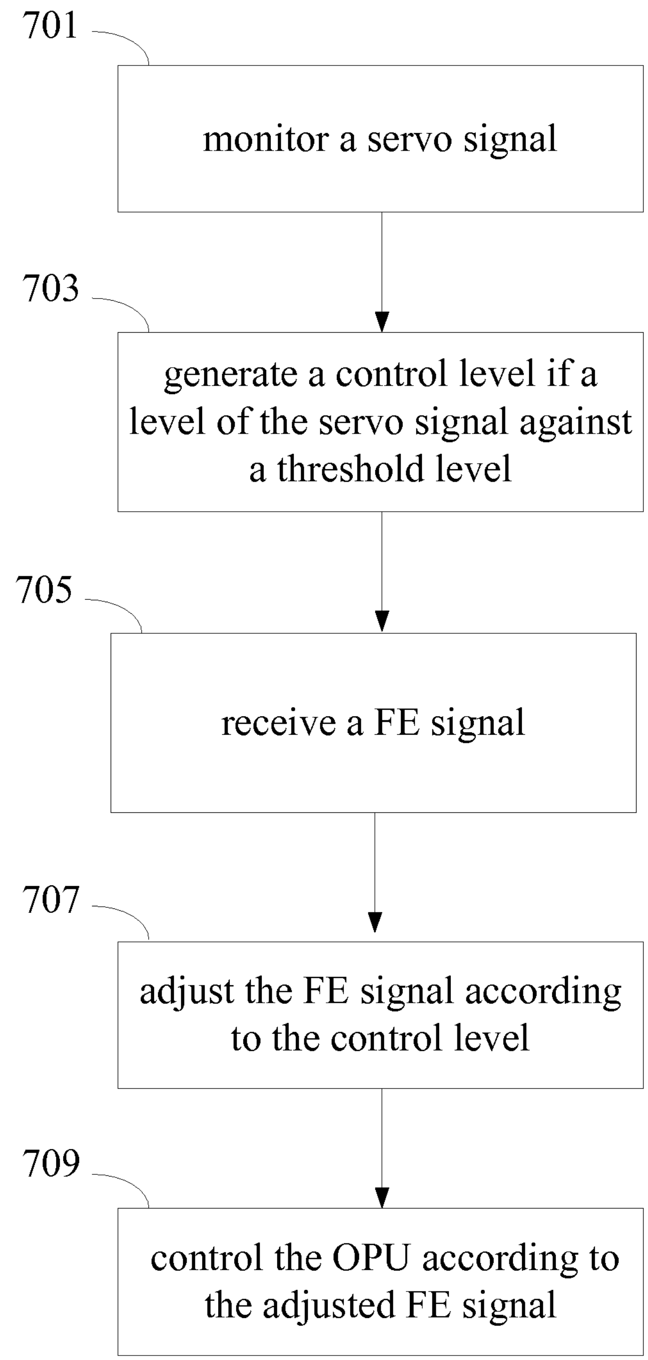
FIG. 7 is a flow chart of a fourth embodiment in accordance with the present invention.

A fourth embodiment of the present invention is a method for controlling an OPU of a optical disc drive. The method is adapted for an optical data access apparatus, such as the aforementioned optical data access apparatus 3. FIG. 7 shows a flow chart of the method. In step 701, a comparator monitors a servo signal, wherein the servo signal can be a RF signal or a defect signal as mentioned in the first embodiment. In step 703, the comparator generates a control level if a level of the servo signal is against a threshold level when the OPU is controlled. Step 705 is then executed in which an FE signal is received. In step 707, an adjustment unit adjusts the FE signal according to the control level generated in step 703. Then step 709 is executed in which the OPU is controlled according to the adjusted FE signal.

In addition to the steps shown in FIG. 7, the fourth embodiment is capable of performing all the operations or functions recited in the first embodiment. Those skilled in the art can straightforwardly realize how the fourth embodiment performs these operations and functions based on the above descriptions of the first embodiment. Therefore, the descriptions for these operations and functions are redundant and not repeated herein.

A fifth embodiment of the present invention is another method for controlling an OPU of a optical disc drive. The method is adapted for an optical data access apparatus, such as the aforementioned optical data access apparatus 5. In contrast with the fourth embodiment, the fifth embodiment comprises a step of generating an FOO instead of the step of receiving an FE signal (step 705). The adjusting step shifts a level of the FOO by subtracting the control level from the FOO. The shifted FOO is generated in the focus-on period and/or the focus-drop period to prevent the OPU from hitting an optical disc.

In addition to the steps mentioned above, the fifth embodiment is capable of performing all the operations or functions recited in the second embodiment. Those skilled in the art can straightforwardly realize how the fifth embodiment performs these operations and functions based on the above descriptions of the second embodiment. Therefore, the descriptions for these operations and functions are redundant and not repeated herein.

Figure 8:
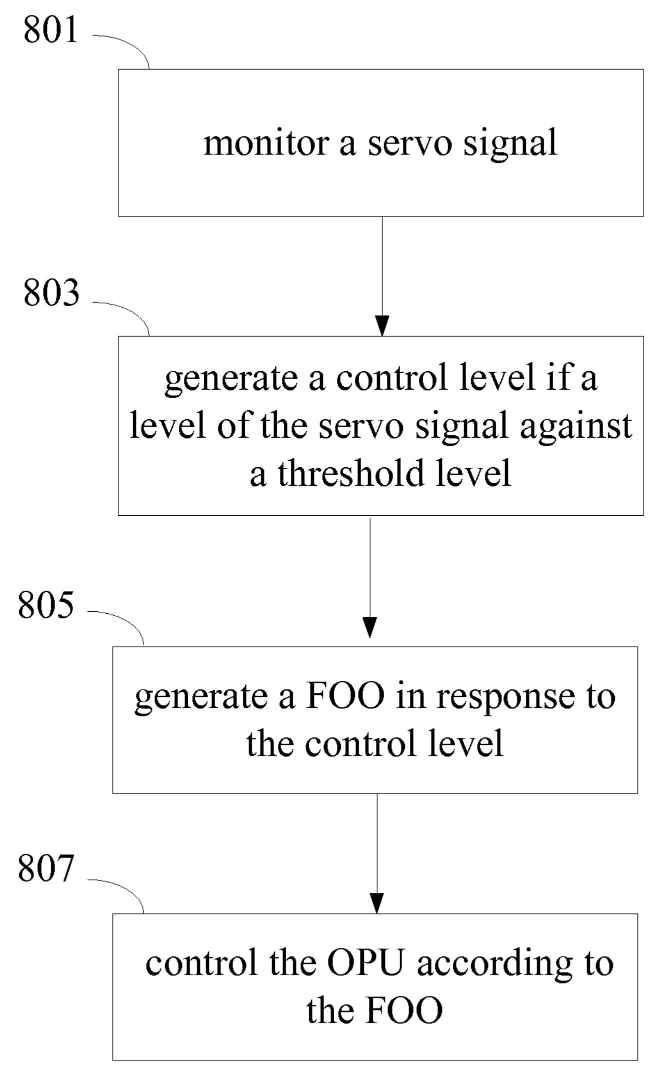
FIG. 8 is a flow chart of a sixth embodiment in accordance with the present invention.

A sixth embodiment of the present invention is yet another method for controlling an OPU of a optical disc drive. The method is adapted for an optical data access apparatus, such as the aforementioned optical data access apparatus 6. Please refer to FIG. 8, shows a flow chart of the method. In step 801, a comparator monitors a servo signal, wherein the servo signal can be a RF signal or a defect signal as mentioned in the first embodiment. In step 803, the comparator generates a control level if a level of the servo signal is against a threshold level when the OPU is controlled. Step 805 is then executed in which an FOO is generated in response to the control level. In step 807, the OPU is controlled according to the FOO.

In addition to the steps mentioned above, the sixth embodiment is capable of performing all the operations or functions recited in the third embodiment. Those skilled in the art can straightforwardly realize how the sixth embodiment performs these operations and functions based on the above descriptions of the third embodiment. Therefore, the descriptions for these operations and functions are redundant and not repeated herein.

The present invention provides a certain level to control an OPU of an optical data access apparatus so that the OPU would not hit a disc during the focus-on period and/or focus-drop period.

The above disclosure is related to the detailed description and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A method for controlling an optical pick-up (OPU), comprising steps of:

monitoring a servo signal;

generating a control level if a level of the servo signal crosses a threshold level when the OPU is controlled by a control signal;

reducing the control signal according to the control level to generate an adjusted control signal; and controlling the OPU by the adjusted control signal, wherein the step of reducing the control signal according to the control level to generate an adjusted control signal comprises following substeps:

receiving a control signal to determine whether the OPU is able to access data correctly, wherein the control signal is a focus error (FE) signal; and obtaining an adjusted control signal by subtracting the control level from the FE signal.

2. The method as claimed in claim 1, wherein the step of generating a control level is executed during a period between a focus-search period and a focus-on period.

3. The method as claimed in claim 1, wherein the step of generating a control level is executed during a focus-drop period.

4. The method as claimed in claim 1, wherein the OPU is controlled to access data from an optical disc, and a value of the control level is determined according to a format of the optical disc.

5. An optical data access apparatus, comprising:

an OPU for accessing data from an optical disc;

a signal generator for generating a servo signal in response to the access, said signal generator further generating an FE signal to determine whether the OPU is able to access data correctly when the OPU accesses the data from the optical disc, wherein the FE signal is the control signal and is transmitted to the adjustment unit, and the adjustment unit shifts a level of the FE signal by subtracting the control level;

a comparator for comparing the servo signal with a threshold level, and generating a control level if a level of the servo signal crosses the threshold level when the OPU is controlled by a control signal; and an adjustment unit for reducing the control signal according to the control level to generate an adjusted control signal;

wherein the OPU is controlled by the adjusted control signal.

6. The optical data access apparatus as claimed in claim 5, further comprising a focus control unit coupled to the adjustment unit for receiving the shifted FE signal and generating an FOO to control a movement of the OPU.

7. The optical data access apparatus as claimed in claim 5, wherein the comparator generates the control level during a period between a focus-search period and a focus-on period.

8. The optical data access apparatus as claimed in claim 5, wherein the comparator generates the control level during a focus-drop period.

9. The optical data access apparatus as claimed in claim 5, wherein a value of the control level is determined according to a format of the optical disc.

10. The optical data access apparatus as claimed in claim 5, wherein the servo signal is an RF signal, or a defect signal indicating a defect status.

* * * * *